US009144271B2

(12) United States Patent
Tribelhorn

(10) Patent No.: US 9,144,271 B2
(45) Date of Patent: Sep. 29, 2015

(54) GLASSES CLIP

(71) Applicant: JoDeeCo, LLC, Loveland, CO (US)

(72) Inventor: Jo Dee Tribelhorn, Loveland, CO (US)

(73) Assignee: JODEECO, LLC, Loveland, CO (US)

( * ) Notice: Subject to any disclaimer, the term of this patent is extended or adjusted under 35 U.S.C. 154(b) by 0 days.

(21) Appl. No.: 14/231,076

(22) Filed: Mar. 31, 2014

(65) Prior Publication Data

US 2014/0320798 A1    Oct. 30, 2014

Related U.S. Application Data

(60) Provisional application No. 61/817,701, filed on Apr. 30, 2013.

(51) Int. Cl.
G02C 1/00 (2006.01)
A44B 99/00 (2010.01)
A45F 5/02 (2006.01)
G02C 11/00 (2006.01)
A47G 29/08 (2006.01)
G02C 3/04 (2006.01)

(52) U.S. Cl.
CPC . *A44B 99/00* (2013.01); *A45F 5/02* (2013.01); *A47G 29/08* (2013.01); *G02C 3/04* (2013.01); *G02C 11/00* (2013.01); *Y10T 24/1371* (2015.01)

(58) Field of Classification Search
CPC .......... G02C 11/00; A47G 29/08; A45F 5/02; A45F 2200/0541

USPC ................. 351/158; 24/3.3; 248/309.1, 316.7
See application file for complete search history.

(56) References Cited

U.S. PATENT DOCUMENTS

| 231,051 | A | * | 8/1880 | Jenkins | 24/3.3 |
|---|---|---|---|---|---|
| D25,631 | S | | 6/1896 | Hayden | |
| 768,122 | A | * | 8/1904 | Hamilton | 248/316.5 |
| D387,637 | S | | 12/1997 | Salgy | |
| D402,191 | S | | 12/1998 | Feder | |
| D466,791 | S | | 12/2002 | Kelleghan | |
| D488,371 | S | | 4/2004 | Shaljian | |
| 6,880,930 | B1 | * | 4/2005 | Henderson | 351/158 |
| D612,710 | S | | 3/2010 | Kelleghan | |
| D650,827 | S | | 12/2011 | Northington | |
| D656,000 | S | | 3/2012 | Halleck | |
| D709,283 | S | | 7/2014 | Adelman | |
| D713,445 | S | | 9/2014 | Berning et al. | |
| D720,128 | S | | 12/2014 | Fong et al. | |
| D724,413 | S | | 3/2015 | Hamilton | |

OTHER PUBLICATIONS

U.S. Appl. No. 29/453,550, Jun. 29, 2015, Notice of Allowance.

* cited by examiner

Primary Examiner — Huy K Mai
(74) Attorney, Agent, or Firm — Workman Nydegger

(57) ABSTRACT

An eyeglasses clip includes a first receiving end and a second stabilizing end. The first receiving end can attach to an external anchoring point and receive at least one temple arm of a pair of eyeglasses. The second stabilizing end can be distinct from the first receiving end and can receive the at least one temple arm. Additionally, the eyeglasses clip can receive the at least one temple arm such that the rotational and latitudinal movement of the at least one temple arm is limited.

20 Claims, 8 Drawing Sheets

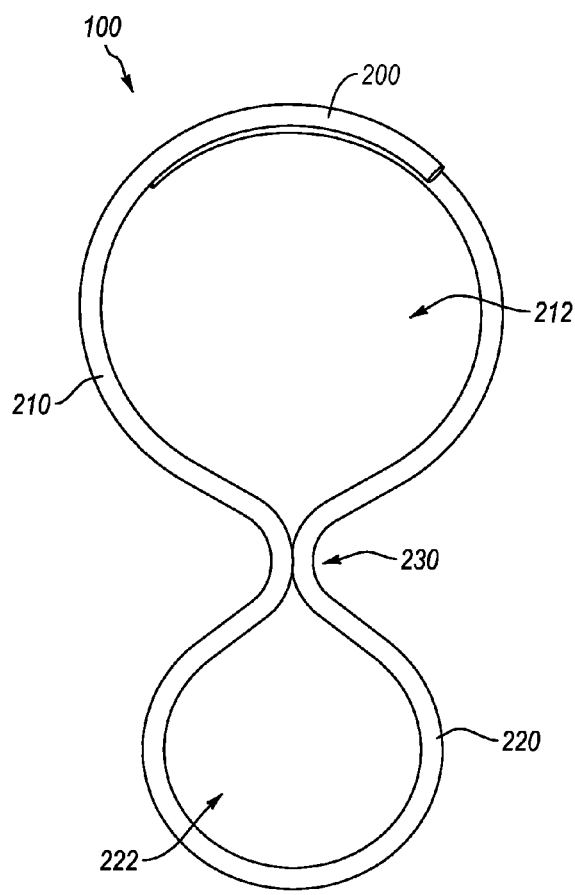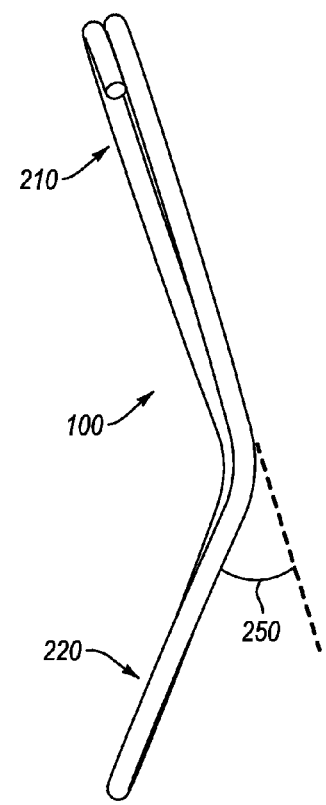
*FIG. 2A*  *FIG. 2B*

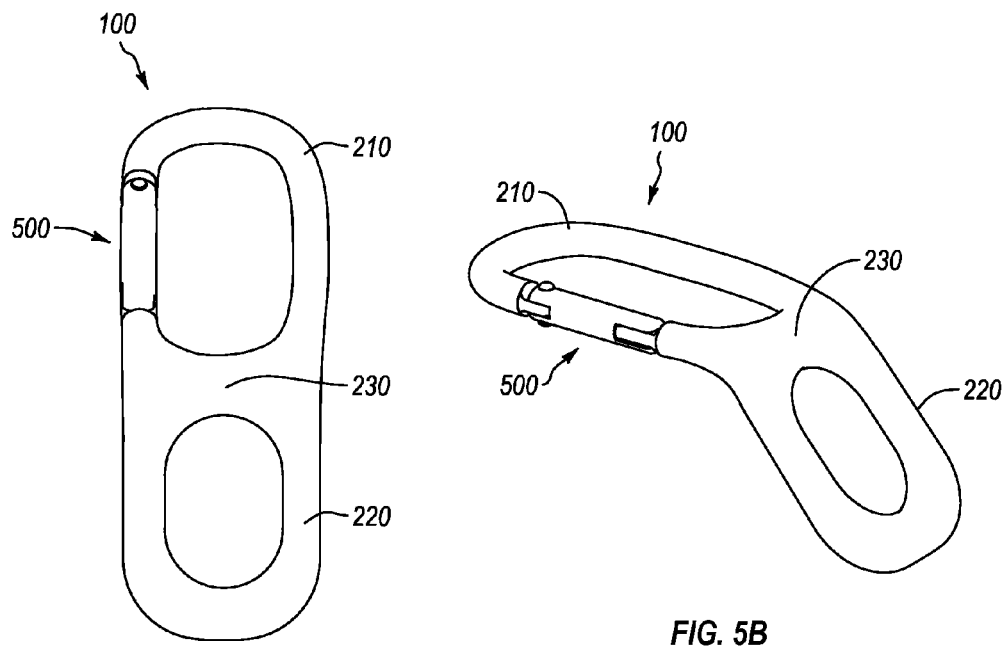
FIG. 5A
FIG. 5B
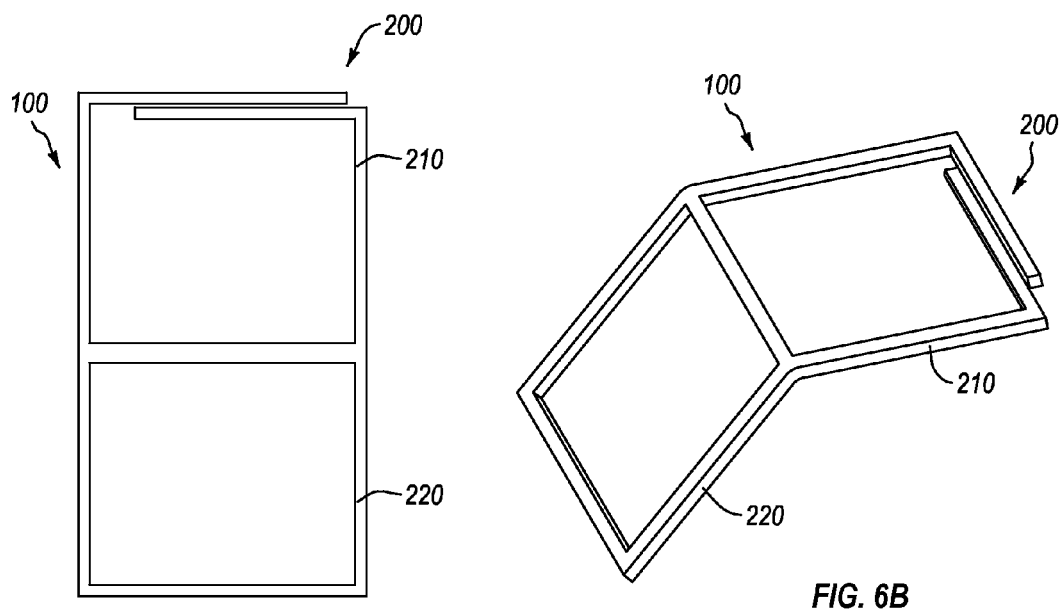
FIG. 6A
FIG. 6B

GLASSES CLIP

CROSS-REFERENCE TO RELATED APPLICATIONS

The present application claims the benefit of priority to U.S. Provisional Patent Application No. 61/817,701 filed Apr. 30, 2013, entitled "Glasses Clip," the entire content of which is incorporated by reference herein.

BACKGROUND OF THE INVENTION

1. Technical Field

The present invention relates to the field of accessories for carrying and holding eyeglasses.

2. Background and Relevant Art

Many individuals use eyeglasses on a daily basis. In some cases, the eyeglasses may be prescription eyeglasses that are required for daily tasks or reading eyeglasses that are only occasionally required. In other cases, the eyeglasses can be sunglasses that are only used while driving or while otherwise exposed to bright sun. Similarly, safety glasses used in industrial, laboratory, or medical applications may only be used while actual work is being performed, and then may otherwise be removed. One will understand that in many cases an individual may wish to remove his or her eyeglasses and temporarily store the eyeglasses in a safe place that is easily accessible. Many conventional systems for temporarily storing eyeglasses require the eyeglasses to be placed within a container. Once placed within a container, however, the eyeglasses and container are often placed within a bag, which can make the container and eyeglasses difficult to find and easily access later.

Accordingly, there are a number of problems in the art relating to temporarily storing eyeglasses in a safe place.

BRIEF SUMMARY OF THE INVENTION

Implementations of the present invention comprise systems and apparatus configured to store eyeglasses in a safe and easily accessible manner. In particular, implementations of the present invention comprise an eyeglass clip that comprises a first end and a second end that both receive a temple arm of the eyeglasses. The first end and the second end provide both lateral and rotational stability to the eyeglasses with respect to the eyeglasses clip. The described eyeglasses clip can be attached to an anchoring point such as a purse handle, backpack strap, brief case handle, button hole, golf bag, zipper pull, belt loop, etc. In particular, an individual can store or retrieve his or her glasses using only a single hand. As such, an individual's eyeglasses can be safely held by the eyeglasses clip and remain easily accessible.

At least one implementation of an eyeglasses clip comprises an eyeglasses clip that includes a first receiving end and a second stabilizing end. The first receiving end can attach to an external anchoring point and receive at least one temple arm of a pair of eyeglasses. The second stabilizing end can be distinct from the first releasable end and can also receive the at least one temple arm. Additionally, the eyeglasses clip can receive the at least one temple arm such that the rotational and latitudinal movement of the at least one temple arm is limited.

Further, at least one implementation of an eyeglasses clip can comprise a first receiving end. The first receiving end can be attached to an external anchoring point. The first receiving end can also be configured to receive at least one temple arm of a pair of eyeglasses. The eyeglasses clip can also comprise a second stabilizing end. The second stabilizing end can be distinct from the first receiving end. The second stabilizing end can also be configured to receive the at least one temple arm of the pair of eyeglasses. In particular, the eyeglasses clip can receive the at least one temple arm such that the rotational and latitudinal movement of the at least one temple arm is limited.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2A and 2B illustrate depictions of an implementation of the eyeglasses clip of the present invention in isolation;

FIGS. 5A and 5B illustrate depictions of another implementation of the eyeglasses clip of the present invention;

FIGS. 6A and 6B illustrate depictions of yet another implementation of the eyeglasses clip of the present invention;

DETAILED DESCRIPTION OF THE PREFERRED EMBODIMENTS

The present invention extends to systems and apparatus configured to store eyeglasses in a safe and easily accessible manner. In particular, implementations of the present invention comprise an eyeglass clip that comprises a first end and a second end that both receive a temple arm of the eyeglasses. The first end and the second end provide both lateral and rotational stability to the eyeglasses with respect to the eyeglasses clip. The described eyeglasses clip can be attached to an anchoring point such as a purse handle, backpack strap, brief case handle, button hole, golf bag, zipper pull, belt loop, etc. In particular, an individual can store or retrieve his or her glasses using only a single hand. As such, an individual's eyeglasses can be safely held by the eyeglasses clip and remain easily accessible. Accordingly, at least one implementation of the present invention provides an eyeglasses clip that can safely hold eyeglasses in an easily accessible location.

Figure 1A:
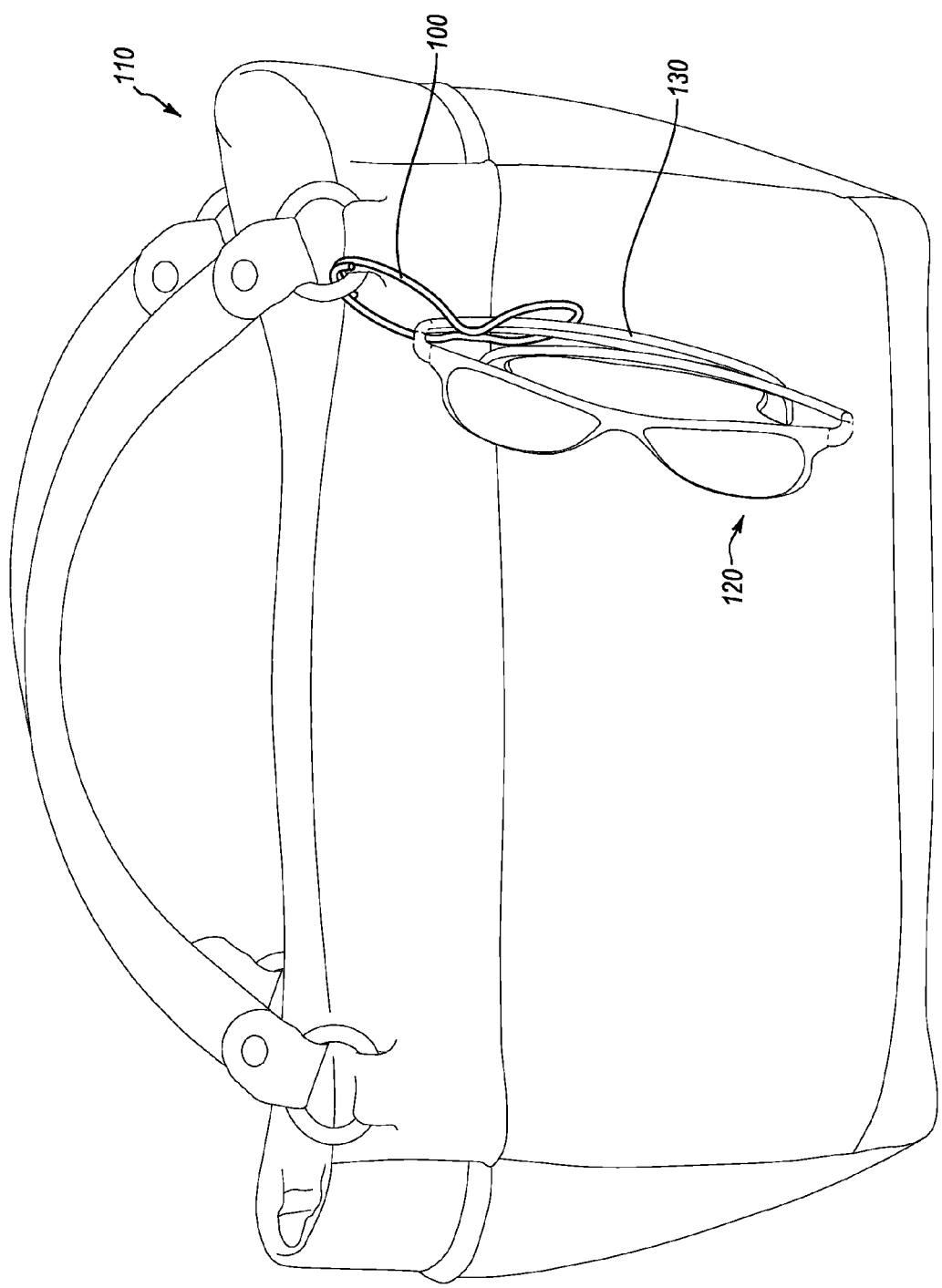
FIGS. 1A and 1B illustrate depictions of an implementation of an eyeglasses clip of the present invention attached to a purse.
Figure 1B:
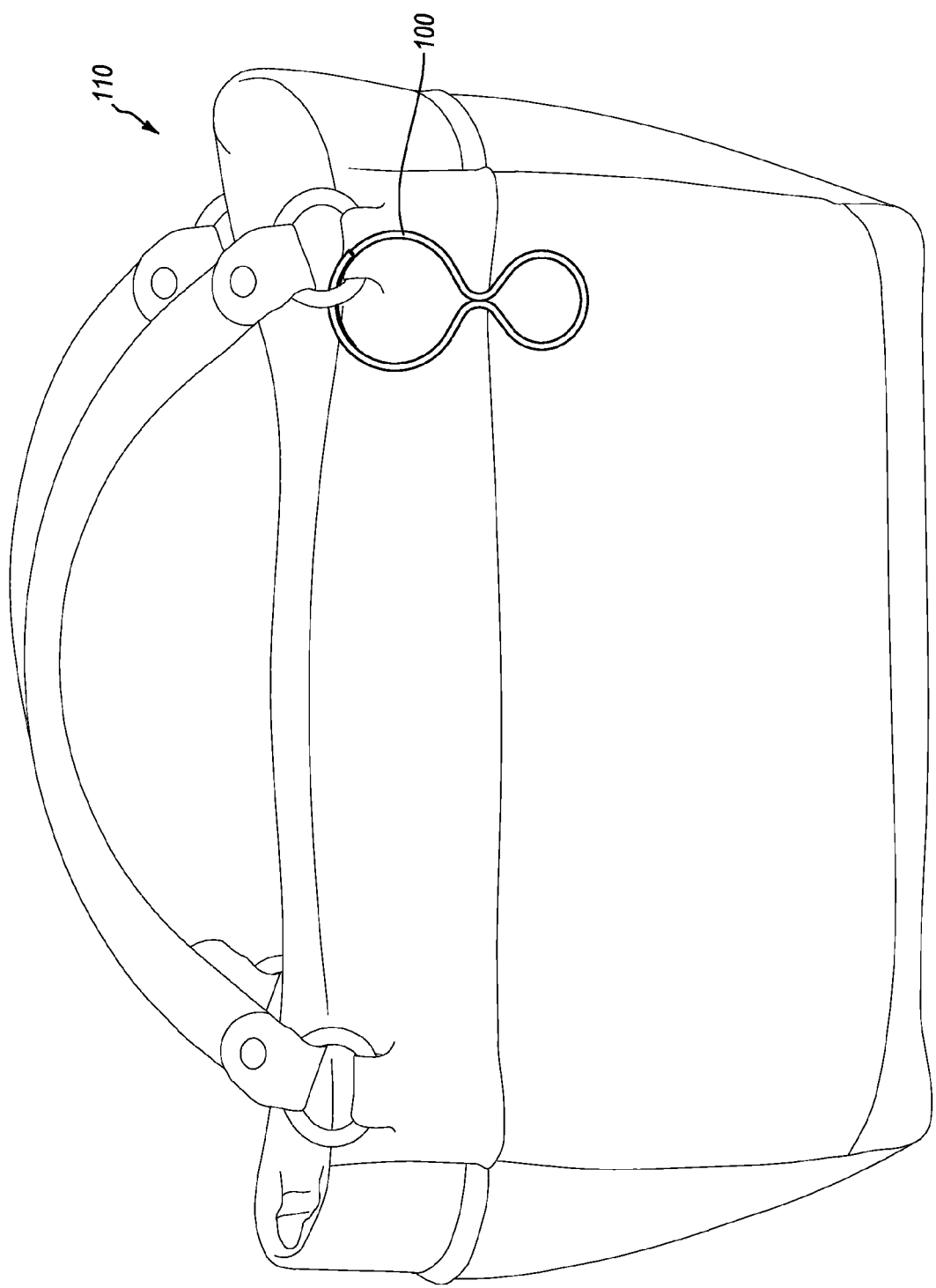

For example, FIGS. 1A and 1B illustrate depictions of an implementation of an eyeglasses clip 100 (or fastener) of the present invention attached to a purse 110. Additionally, FIG. 1A depicts a pair of eyeglasses 120 disposed within the eyeglasses clip 100. In particular, a temple arm 130 of the eyeglasses 120 can be disposed within the eyeglasses clip 100.

FIGS. 2A and 2B illustrate depictions of an implementation of the eyeglasses clip of the present invention. In at least one implementation, the eyeglasses clip 100 can include a first releasable end 210. The first releasable end 210 can comprise an opening 200 that can be used to attach the eyeglasses clip 100 to an anchoring point. For instance, the eyeglasses clip 100 can be anchored to a purse, a briefcase, a book bag, a belt loop on a pair of pants, or some other appropriate anchoring point. As depicted, the opening 200 can be a gap or overlap in the structure of the eyeglasses clip 100. For example, in FIGS. 2A and 2B the eyeglasses clip 100 can comprise a wire structure, and the opening, in turn, can comprise an area where the wire structure of the eyeglasses clip 100 overlaps but does not form a closed circuit.

Additionally, in at least one implementation, the first releasable end 210 may not comprise an opening 200, but may instead be permanently affixed to an external anchoring point. For example, an eyeglasses clip 100 can comprise a resiliently deformable wire structure (e.g., FIG. 4) that forms a complete circuit through an external anchor point. For instance, in at least one implementation, instead of comprising an opening 200, the eyeglasses clip 100 of FIG. 2A can comprise a welded or soldered connection.

The first releasable end 210 can also receive at least one temple arm 130 of a pair of eyeglasses 130. For example, the temple arm 130 can be longitudinally inserted into a first enclosure 212 that is formed by the first releasable end 210. After being inserted into the first releasable end 210, the temple arm 130 can then also be inserted into a second stabilizing end 220.

The second stabilizing end 220 can comprise a second enclosure 222 that is distinct from the first enclosure 212 of the first releasable end 210. For example, in at least one implementation, the first enclosure 212 and the second enclosure 222 can be separated by a divider 230, in this implementation a narrow channel. In at least one implementation, the first enclosure 212 and the second enclosure 222 can also be completely separated such that the divider 230 physically divides the first enclosure 212 from the second enclosure 222.

Similar to the first releasable end 210, the temple arm 130 can also be longitudinally inserted into the second enclosure 222 that is formed by the second stabilizing end 220. In at least one implementation as depicted in FIG. 1A, when inserted into the eyeglasses clip 100 the temple arm 130 passes through both the first enclosure 212 and the second enclosure 222, which can be separated from each other by the divider 230.

By placing the temple arm 130 within both the first enclosure 212 and the second enclosure 222, the temple arm 130 may have only limited rotational and latitudinal movement with respect to the eyeglasses clip 100. One will understand that limiting the rotational and latitudinal movement of the eyeglasses clip 100 can provide significantly more protection to a pair of eyeglasses 120. In particular, one will understand that not limiting the rotational movement of a pair of eyeglasses 130 within an eyeglasses clip 100 may allow the eyeglasses 120 to rotate and fall out of the clip—potentially damaging or breaking the eyeglasses 120.

Additionally, in at least one implementation, the second stabilizing end 220 can be offset by an offset angle 250 from a plane that comprises the first releasable end 210. The offset angle 250 can comprise an angle between about 25 and 55 degrees, preferably between about 30 and about 50 degrees, more preferably between about 35 and about 45 degrees, or still more preferable at an angle of about 40 degrees. The offset angle 250 can aid in allowing the temple arm 130 to pass through both the first releasable end 210 and the second stabilizing end 220. Additionally, the offset angle 250 may aid in allowing a pair of eyeglasses 120 to hang vertically when the eyeglasses 120 are engaged with the eye eyeglasses clip 100 and hanging from an external anchor point.

Figure 3A:
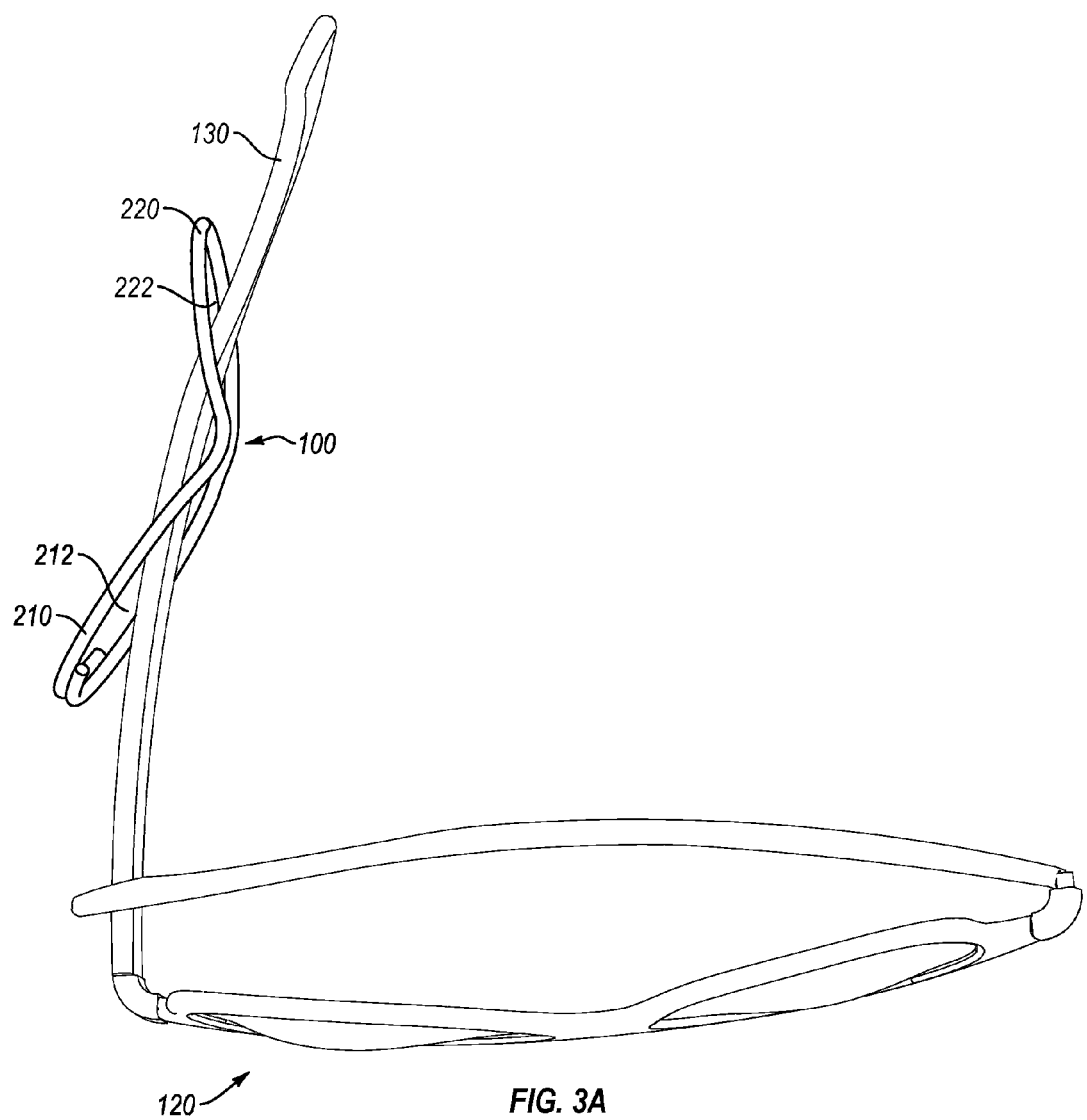
FIGS. 3A and 3B illustrate depictions of a temple arm being inserted into an implementation of the eyeglasses clip of the present invention.
Figure 3B:
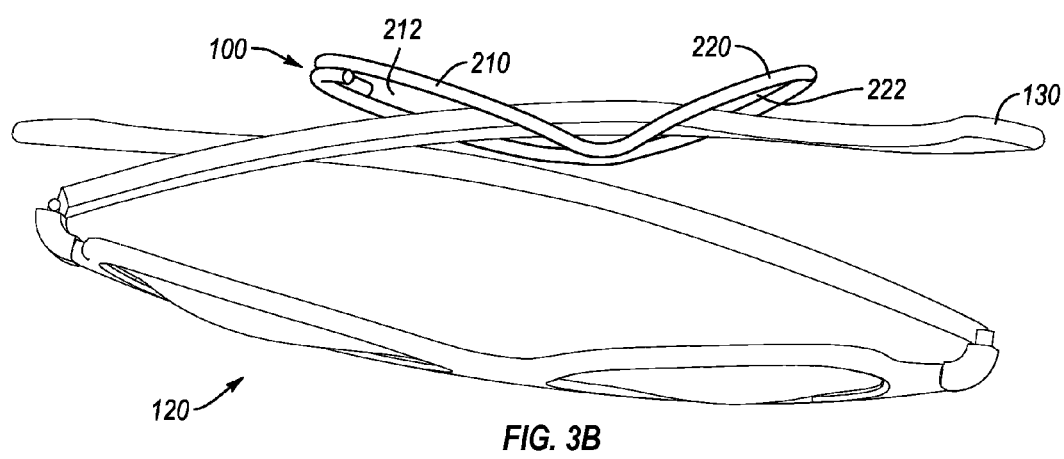

FIGS. 3A and 3B illustrate depictions of a temple arm 130 being inserted into the eyeglasses clip 100 of the present invention. As depicted, the temple arm 130 can be inserted through both the first enclosure 212 of the first releasable end 210 and the second enclosure 222 of the second stabilizing end 220. While FIGS. 3A and 3B are shown with the eyeglasses clip 100 not being anchored to anything, one will understand that the depicted method of inserting a pair of eyeglasses 120 into the eyeglasses clip 100 can be performed when the eyeglasses clip 100 is attached to an external anchor.

Figure 4:
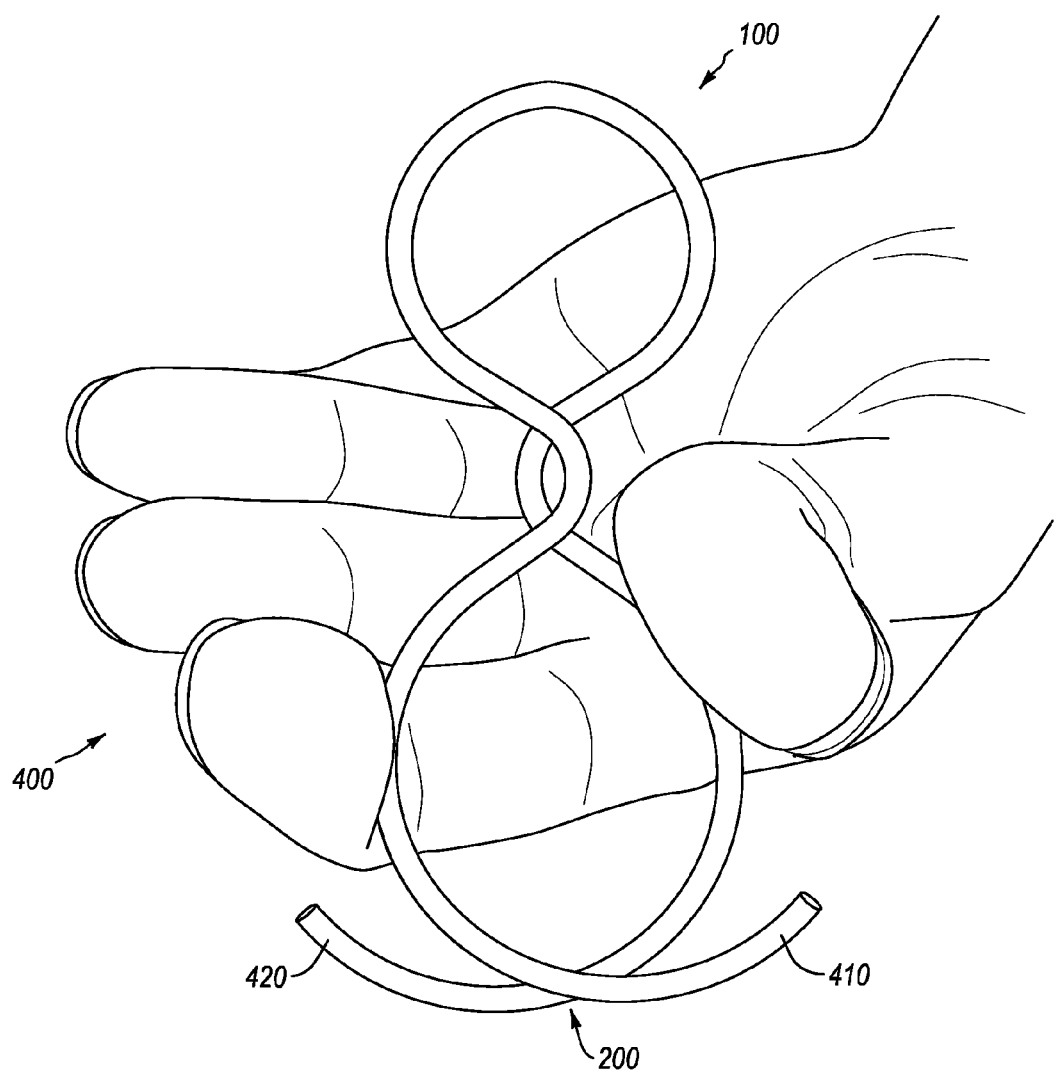
FIG. 4 illustrates a depiction of an implementation of the eyeglasses clip of the present invention being opened.

FIG. 4 illustrates a depiction of the first releasable end 210 of the eyeglasses clip 100 of the present invention being opened, i.e., the clip is resiliently deformable. In particular, a hand 400 is shown squeezing the eyeglasses clip 100 such that the opening 200 can be created when a first end 410 of the non-circuitous eyeglasses clip structure passes a second end 420 of the non-circuitous eyeglasses clip structure. Either the first end 410 or the second end 420 can then be fed through an anchor point and the hand 400 can release the eyeglasses clip 100. Once the hand 400 releases the eyeglasses clip 100, the eye eyeglasses clip 100 can return to its normal form, and thus enclose the anchor point (e.g., see FIGS. 1A and 1B).

FIGS. 5A and 5B illustrate depictions of another implementation of the eyeglasses clip 100 of the present invention. In the depicted implementation of the eyeglasses clip 100, the first releasable end 210 can comprise a carabineer 500 with a resiliently deformable portion (e.g., a releasable gate 500). In contrast to the above description where the eyeglasses clip 100 was squeezed in order to open the first releasable end 210, an eyeglass clip 100 of the present implementation can be attached to an anchor through engaging the carabineer 500 with the anchor.

FIGS. 6A and 6B illustrate depictions of yet another implementation of the eyeglasses clip 100 of the present invention. In the depicted implementation of the eyeglasses clip 100, the eyeglasses clip 100 can comprise a substantially rectangular shape, and both the first releasable end 210 and the second stabilizing end 220 can also comprise substantially rectangular shapes. Additionally, the opening 200 of the depicted implementation can operate similarly to the opening 200 of FIG. 4.

Figure 7A:
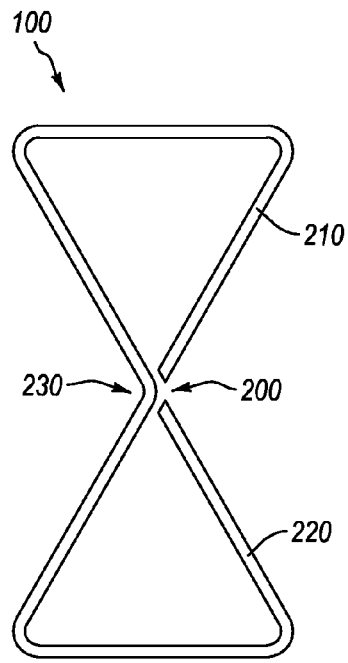
FIGS. 7A and 7B illustrate depictions of still another implementation of the eyeglasses clip of the present invention.
Figure 7B:
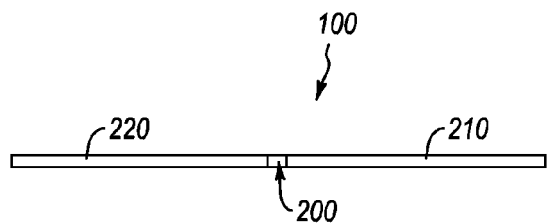

FIGS. 7A and 7B illustrate depictions of still another implementation of the eyeglasses clip 100 of the present invention. In the depicted implementation of the eyeglasses clip 100, the eyeglasses clip 100 can comprise a substantially hour glass shape. Additionally, both the first releasable end 210 and the second stabilizing end 220 can comprise triangular shapes. In at least one implementation, the opening 200 can be located near the divider 230. The eyeglasses clip 100 can be attached to an anchoring point by sliding a portion of the anchoring point through the opening 200 and sliding the anchor into the first releasable end 210.

As depicted in FIG. 7B, the eyeglasses clip 100 can also comprise no angular offset between the first releasable end 210 and the second stabilizing end 220. Additionally, in at least one implementation, the eyeglasses clip 100 can comprise (or include at least a portion that comprises) a plastic, rubber, or other resiliently deformable materials, such as any number of resiliently deformable metal, rubber, or plastic materials, composites thereof, or an elastomeric material that includes some bending characteristics. One will understand that an elastomeric eyeglasses clip 100 may comprise no permanent angular offset, but may, nonetheless, be able to conform to an angular offset when a temple arm 130 is inserted into the first releasable end 210 and the second stabilizing end 220.

An elastomeric eyeglasses clip 100 may also exert additional friction on a pair of eyeglasses 120 that are being held in the eyeglasses clip 100. In particular, the surface of the elastomeric eyeglasses clip 100 may have a higher coefficient of friction than a metal eyeglasses clip 100, for example. Additionally, the elastomeric material may provide additional cushion and shock absorption that may aid in protecting the pair of eyeglasses 120. Accordingly, an eyeglasses clip 100 of any material may comprise an elastomeric bumper or lining within either or both of the first releasable end 210 and the second stabilizing end 220.

Figure 8A:
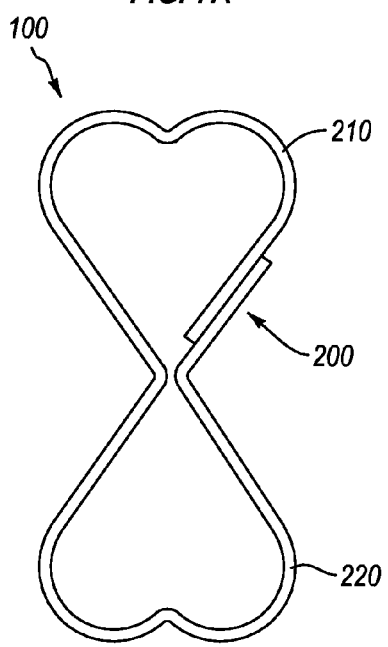
FIGS. 8A and 8B illustrate depictions of yet still another implementation of the eyeglasses clip of the present invention.
Figure 8B:
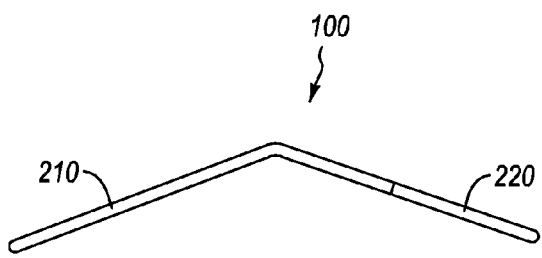

FIGS. 8A and 8B illustrate depictions of yet still another implementation of the eyeglasses clip of the present invention. In the depicted implementation of the eyeglasses clip 100, both the first releasable end 210 and the second stabilizing end 220 also comprise respective heart shapes. In additional implementations, the eyeglasses clip 100 can comprise shapes that resemble stars, birds, animals, flowers, clovers, trees, cars, planes, or any other novelty shape.

In at least one implementation, the opening 200 can be located at or near the divider 230. The eyeglasses clip 100 can be attached to an anchoring point by sliding a portion of the anchoring point through the opening 200 and sliding the anchor into either the first releasable end 210 or the second stabilizing end 220. One will understand that in at least some implementations the first releasable end 210 and the second stabilizing end 220 can be interchangeable with each other.

Figure 9A:
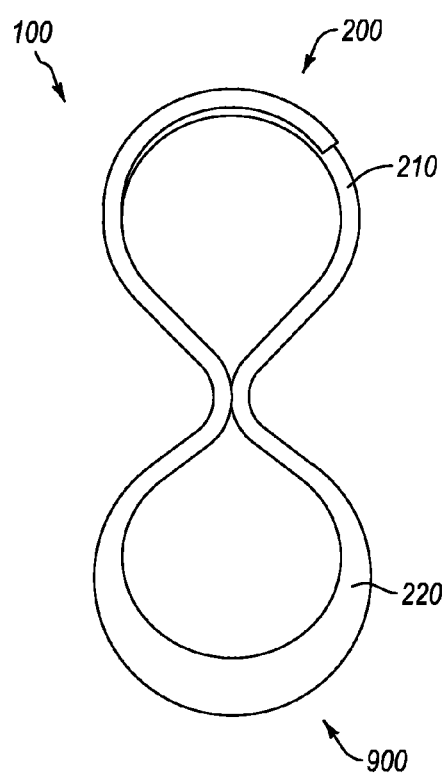
FIGS. 9A and 9B illustrate depictions of another implementation of the eyeglasses clip of the present invention.
Figure 9B:
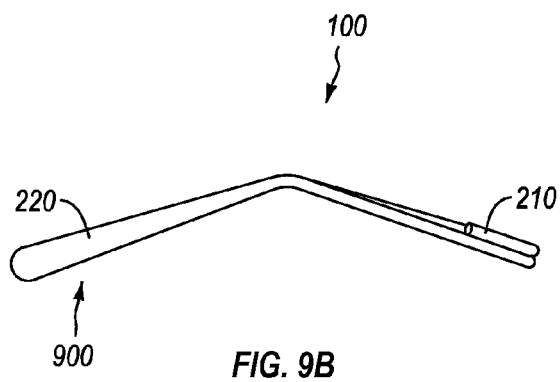

FIGS. 9A and 9B illustrate depictions of another implementation of the eyeglasses clip of the present invention. In the depicted implementation, the eye eyeglasses clip 100 comprises a shape and form similar to the implementation depicted in FIGS. 2A and 2B, except that eyeglasses clip 100 of FIGS. 9A and 9B can comprise a weighted portion 900. In particular, the second stabilizing end 220 comprises the weighted portion 900. In at least one implementation, when the eyeglasses clip 100 is attached to an external anchoring point, the weighted portion 900 can cause the eyeglasses clip 100 to remain upright (i.e., with the first releasable end 210 directly above the second stabilizing end 220). One will understand that this may provide additional protection against a pair of eyeglasses 120 slipping out of the eyeglasses clip 100 and may also make it easier to insert a temple arm 130 into the eyeglasses clip 100.

Accordingly, FIGS. 1A-9B comprise various implementations of the present invention. In particular, the present invention can include an eyeglasses clip 100 that receives a temple arm 130 of a pair of eyeglasses 120 through a first releasable end 210 and a second stabilizing end 220 that is distinct from the first releasable end 210. Additionally, the present invention can be attached to an external anchor such as a purse, a belt loop, a bag, or some other commonly carried or worn item. One will understand that benefits that can be provided by an apparatus that safely carries a pair of eyeglasses 120, yet is easy to access.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A system for storing eyeglasses, the system comprising:
a pair of eyeglasses, the eyeglasses comprising at least one temple arm; and
an eyeglasses clip, the eyeglasses clip comprising:
a first releasable end, the first releasable end configured to open and attach to an external anchoring point and the at least one temple arm longitudinally received by the first releasable end; and
a second stabilizing end, the second stabilizing end being distinct from the first releasable end and the at least one temple arm longitudinally received by the second stabilizing end;
wherein the eyeglasses clip receives the at least one temple arm such that the rotational and latitudinal movement of the at least one temple arm is limited with respect to the eyeglasses clip.

2. The system as recited in claim 1, wherein the first releasable end comprises a carabineer.

3. The system as recited in claim 1, wherein the first releasable end is configured to open when squeezed.

4. The system as recited in claim 1, further comprising:
a rubber bumper affixed to a portion of the first releasable end,
wherein the rubber bumper is configured to protect the eyeglasses and to provide additional friction between the first releasable end and the at least one temple arm.

5. The system as recited in claim 1, wherein the external anchoring point comprises a purse.

6. The system as recited in claim 1, wherein the external anchoring point comprises a belt loop on a pair of pants.

7. The system as recited in claim 1, wherein the second stabilizing end is offset by between 25 degrees and 55 degrees from a plane that comprises the first releasable end.

8. The system as recited in claim 7, wherein the second stabilizing end is offset by between 30 degrees and 50 degrees from a plane that comprises the first releasable end.

9. The system as recited in claim 8, wherein the second stabilizing end is offset by between 30 degrees and 50 degrees from a plane that comprises the first releasable end.

10. The system as recited in claim 9, wherein the second stabilizing end is offset by between 35 degrees and 45 degrees from a plane that comprises the first releasable end.

11. The system as recited in claim 10, wherein the second stabilizing end is offset by approximately 40 degrees from a plane that comprises the first releasable end.

12. An eyeglasses clip, the eyeglasses clip comprising:
a first receiving end, the first receiving end attached to an external anchoring point and configured to receive at least one temple arm of a pair of eyeglasses; and
a second stabilizing end, the second stabilizing end being distinct from the first receiving end and configured to receive the at least one temple arm;
wherein the eyeglasses clip receives the at least one temple arm such that the rotational and latitudinal movement of the at least one temple arm is limited.

13. The eyeglasses clip as recited in claim 12, wherein the anchoring point comprises a purse.

14. The eyeglasses clip as recited in claim 12, wherein the first receiving end comprises an opening configured to receive the external anchoring point.

15. The eyeglasses clip as recited in claim 14, wherein the opening is defined by a first end of a non-circuitous portion of the eyeglasses clip and a second end of the non-circuitous portion of the eyeglasses clip.

16. The eyeglasses clip as recited in claim 15, wherein the first end and the second end overlap.

17. The eyeglasses clip as recited in claim 12, comprising a divider that divides the first receiving end from the second stabilizing end.

18. The eyeglasses clip as recited in claim 12, wherein a portion of the divider comprises at least a portion of an opening that is configured to receive the external anchoring point.

19. The eyeglasses clip as recited in claim 12, wherein a first plane comprises the first receiving end and a second plane comprises the second stabilizing end, and further wherein the first plane and the second plane are not parallel.

20. An eyeglasses clip, the eyeglasses clip comprising:
 a first releasable end, the first releasable end configured to open and attach to an external anchoring point and at least one temple arm longitudinally received by the first releasable end; and
 a second stabilizing end, the second stabilizing end being distinct from the first releasable end and the at least one temple arm longitudinally received by the second stabilizing end;
 wherein the eyeglasses clip receives the at least one temple arm such that the rotational and latitudinal movement of the at least one temple arm is limited with respect to the eyeglasses clip.

\* \* \* \* \*